United States Patent Office 3,033,875
Patented May 8, 1962

3,033,875
CONDENSED RING HETEROCYCLIC DISULFIDES AND SULFIDES

Lee Nutting, Berkeley, Robert M. Silverstein, Menlo Park, and Chester M. Himel, Portola Valley, Calif., assignors to Hills Bros. Coffee, Inc., San Francisco, Calif., a corporation of California
No Drawing. Filed Sept. 28, 1959, Ser. No. 842,613
4 Claims. (Cl. 260—319)

This invention relates to organic compounds and has particular reference to new organic disulfides and sulfides and to their preparation.

This invention has as an object the preparation of new organic compounds. A further object is the preparation of a new class of organic disulfides and sulfides. Yet another object of this invention is the preparation of a new class of compounds, consisting of bis-heterocyclic disulfides and sulfides wherein an aromatic ring is condensed or fused to each heterocyclic nucleus. The compounds include 4-carbon atoms heterocyclic nuclei containing a single hetero-atom selected from the group consisting of oxygen, nitrogen and sulfur, and 5-carbon heterocyclic nuclei containing nitrogen.

Other objects and advantages of this invention it is believed will be readily apparent from the following detailed description of preferred embodiments thereof.

These and other objects are accomplished by the following invention wherein (a) condensed ring heterocyclic mercaptans are oxidized, (b) heterocyclic aldehydes are reacted with ammonium sulfides, and (c) condensed ring heterocyclic halides are reacted with the corresponding heterocyclic mercaptan, the resulting reaction products in each case being new compounds generically defined as:

(1)
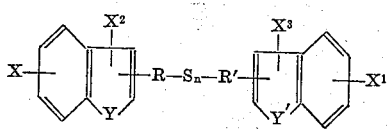

(2)
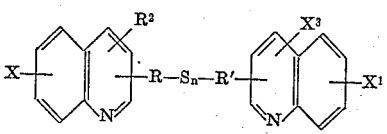

in which R and R' are alkylene radicals having 1–3 carbon atoms; X, X¹, X², X³ are organic residue substituents, for example, —H, —CH₃ or —OCH₃; Y and Y' are

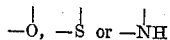

and $n$ is a whole integer not greater than 2.

The invention is illustrated by the following specific examples:

EXAMPLE 1

*Bis-(2-Benzofurfuryl) Disulfide*

(a)
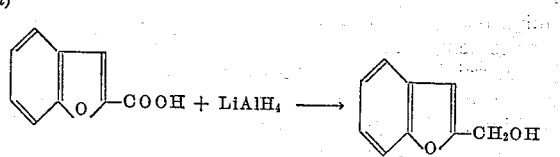

(b)
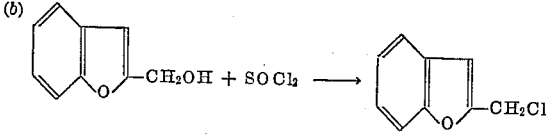

(c)

(d)

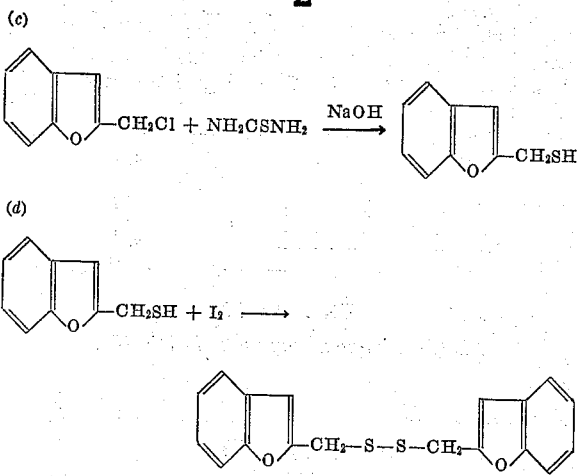

(a) To a stirred slurry of 10 g. of lithium aluminum hydride in 200 ml. ether was added dropwise a solution of 30 g. of coumarilic acid in 200 ml. of ether. After decomposing the complex and excess lithium aluminum hydride, and extracting with ether, 27 g. of coumarilic alcohol was obtained. B.P. 140–145° C. at 13 mm.

(b) and (c) To 5.0 g. of coumarilic alcohol in 40 ml. of ether, stirred and cooled in an ice bath, was added portionwise 5.0 ml. of thionyl chloride in 25 ml. of ether. After 45 minutes, the ether solution was washed, dried, and evaporated. The residue was dissolved in 10 ml. of 95% ethanol and refluxed for 1.5 hours with 2.3 g. of thiourea. After standing overnight, the solution was refluxed for 45 minutes with 2.0 g. of sodium hydroxide in 20 ml. of water. After dilution and acidification, the mixture was extracted with ether. The residue from the ether solution was distilled at 4 mm. at a head temperature of 108–110° C. The distillate (benzofurfuryl mercaptan) weighed 2.2 g., and gave the following analytical values:

|  | Calculated, percent | Found, percent |
| --- | --- | --- |
| Carbon | 65.9 | 66.9 |
| Hydrogen | 4.87 | 5.00 |

(d) To 1.0 g. of benzofurfuryl mercaptan in 10 ml. of ethanol was added 6.1 ml. of 1.0 N sodium hydroxide and 0.4 g. of iodine dissolved in 13 ml. of ethanol. After cooling, the precipitate was filtered and recrystallized from ethanol. The white crystalline product (bis-benzofurfuryl disulfide) melted 84–85° C., weighed 0.6 g., and gave the following analytical values:

|  | Calculated, Percent | Found, Percent |
| --- | --- | --- |
| Carbon | 66.3 | 66.2 |
| Hydrogen | 4.31 | 4.30 |

EXAMPLE 2

*Bis-(3-Indolemethyl) Disulfide*

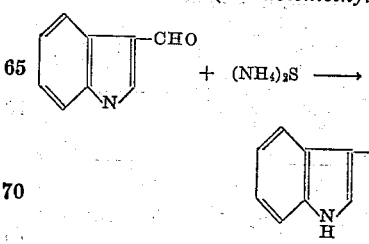

Thirty ml. of absolute alcohol was saturated with ammonia, and one-half of the solution was saturated with hydrogen sulfide. The solutions were combined and added to 1.5 g. of 3-indolealdehyde. After three days, the precipitate was filtered and recrystallized from ethanol. The yield of recrystallized product, melting at 186–187° C. was 1.1 g. The following analytical values were obtained:

| | Calculated, Percent | Found, Percent |
|---|---|---|
| Carbon | 66.7 | 66.5 |
| Hydrogen | 4.95 | 5.13 |

EXAMPLE 3

*Bis-(3-Thionaphthenylmethyl) Disulfide*

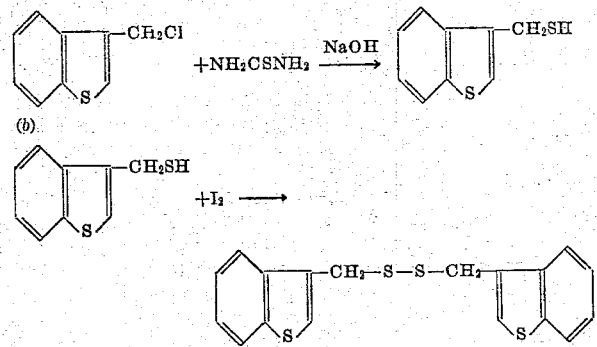

(a) Thiourea (.6 g.) in hot 95% ethanol was added to 3-chloromethylthionaphthene (1.3 g.). The solution was refluxed for nineteen hours and allowed to stand three days. Sodium hydroxide (1 g.) in water (15 ml.) was added to the reaction mixture, and the solution was refluxed five hours. The solution was acidified with hydrochloric acid and extracted with ether. The ether solution was washed with water, dried, and concentrated. The residue distilled at 156° C. at a pressure of 9.5 mm., and (b) the distillate (thionaphthenylmethyl mercaptan) was oxidized with iodine in a sodium bicarbonate solution. The mixture was ether extracted, and the ether layers washed with 5% sodium hydroxide, water and dried. The concentrate was treated with methanol and cooled in Dry Ice. The methanol was drawn off, leaving white crystals. Two recrystallizations from petroleum ether gave white crystals. M.P. 94–96°.

| | Calculated, Percent | Found, Percent |
|---|---|---|
| Carbon | 60.3 | 60.5 |
| Hydrogen | 3.9 | 4.24 |

Other oxidizing agents than the iodine of Examples 1 and 3, such as, for example, ferric chloride, lead peroxide, hydrogen peroxide, and copper sulfate, may be used for the oxidation of the mercaptan compounds.

EXAMPLE 4

*Bis-(2-Benzofurfuryl) Sulfide*

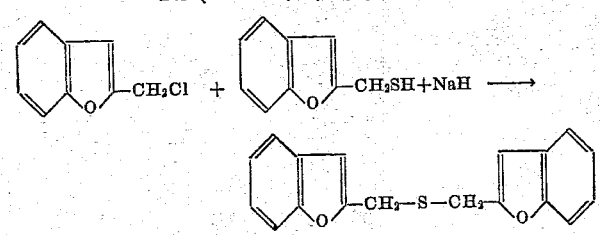

To a stirred solution of 1.5 g. of benzofurfuryl chloride in 40 ml. of benzene was added 0.44 g. of sodium hydride and 1.5 g. of benzofurfuryl mercaptan. The mixture was stirred at room temperature for 0.5 hour, then refluxed for 0.5 hour and allowed to stand overnight. The mixture was filtered, and the benzene was removed. The residue was recrystallized from ethanol. M.P. 72–73° C. The weight of the recrystallized product was 0.3 g.

| Analysis | Calculated, Percent | Found, Percent |
|---|---|---|
| Carbon | 73.5 | 73.0 |
| Hydrogen | 4.8 | 4.9 |
| Sulfur | 11.5 | 10.4 |

EXAMPLE 5

*Bis-(3-Indolemethyl) Sulfide*

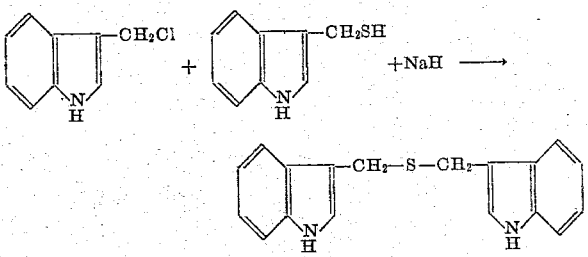

To a stirred solution of 0.3 g. of 3-indolemethanol and 0.23 ml. of pyridine in 5 ml. of ether cooled in an ice bath, was added dropwise 0.17 g. of thionyl chloride in 5 ml. of ether. The mixture was allowed to stand for an additional ten minutes in the ice bath. The supernatant solution was decanted from the sludge which was extracted with a small amount of ether. The combined ether extracts were washed with water and with dilute sodium hydroxide solution. The ether solution was dried, and the ether was removed. The residue was dissolved in 5 ml. of absolute ethanol, and added to a solution of 0.23 g. of 3-indolemethyl mercaptan and 0.04 g. of sodium hydride in 5 ml. of absolute ethanol. The solution was refluxed for 1 hour, evaporated to a volume of 5 ml., diluted with 15 ml. of water and extracted with ether. The ether solution was dried, the ether was removed, and the residue was recrystallized from aqueous ethanol. M.P. 142–144° C. The recrystallized product weighed 0.06 g.

| Analysis | Calculated, Percent | Found, Percent |
|---|---|---|
| Carbon | 73.9 | 73.5 |
| Hydrogen | 5.5 | 5.63 |

It will be apparent from Example 3 that the substituent —R—S—S—R'— is substituted on the nuclear carbon atom at position 3. This invention contemplates five-membered heterocyclic compounds in which such substitution takes place at either position 2 or 3, and it is further contemplated that in the case of six-membered nitrogen-containing heterocyclic compounds such substitution may take place at position 4, in addition to the 2 and 3 positions. Examples of six-membered compounds are:

Bis-(4-quinolylmethyl)disulfide

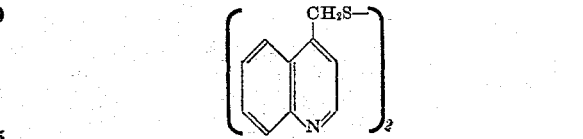

Bis-(3-quinolylmethyl) disulfide

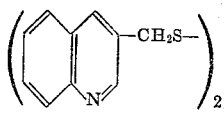

Moreover, the heterocyclic nuclei may contain on nuclear carbon atoms organic residue substituents in addition to the condensed ring and —R—S—S—R'— or —R—S—R'— substituents, and the condensed rings themselves may carry substituents, such as, for example:

Bis-(3-methyl-4,6-dimethoxy-benzofurfuryl) disulfide

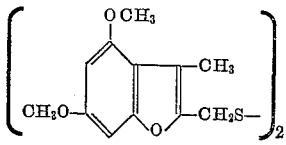

Bis-(2-methyl-(3-indolemethyl)) sulfide

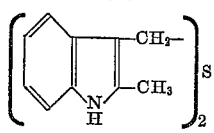

Bis-(4,6-dimethoxy-(2-benzofurfuryl)) sulfide

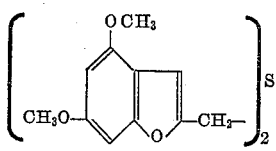

This invention is not limited to symmetrical compounds, i.e., those in which the two heterocyclic members are the same, but comprehends within its scope unsymmetrical compounds containing two different heterocyclic nuclei and compounds in which the two heterocyclic nuclei are the same but in which the heterocyclic members differ in respect to substituents other than the

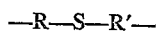

substituent and the condensed ring substituents, such as, for example:

2-indolemethyl-benzofurfuryl disulfide

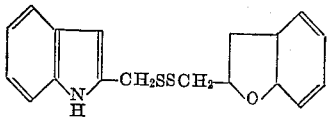

2-methyl-(3-indolemethyl)3-indolemethyl disulfide

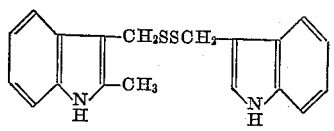

2-benzofurfuryl 2-pyrrolemethyl sulfide

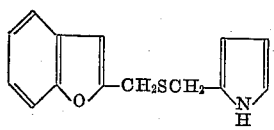

Additionally, the invention includes compounds which are unsymmetrical from the standpoint that the substitution of the —R—S—S—R'— substituent occurs on position 2 on one heterocyclic member and on position 3 or 4 on the other heterocyclic member, or on position 3 on one six-membered heterocyclic member and position 4 on the other.

As used herein, the term "alkylene" is intended to cover both unsubstituted and substituted alkylene groups, such as, for example:

2-(2-benzofurfurylethyl)-3-(2-benzofurfuryl)propyl disulfide

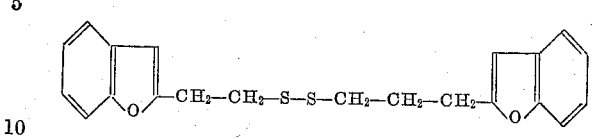

1-methyl-2-(3-indole)ethyl-2-methyl-3-(3-indole)propyl disulfide

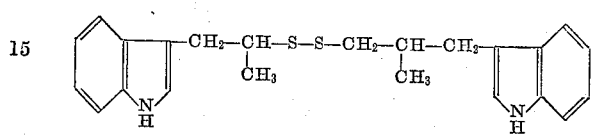

The new compounds of this invention are particularly useful as flavoring agents for foods and beverages. For example, 1 part by weight of each of the following compounds: bis-2-furfuryl disulfide; bis-(3-indolemethyl) disulfide; bis-(3-indolemethyl) sulfide; bis-2-furfuryl sulfide (disclosed in our copending application Serial No. 525,353, filed July 29, 1955, now abandoned); 2-furfuryl isothiocyanate (disclosed in our copending application Serial No. 525,355, filed July 29, 1955, now U.S. Patent 2,905,701); 2-thenyl isothiocyanate (also disclosed in said copending application Serial No. 525,355, now U.S. Patent 2,905,701); comprising a total of 100 mg. was dissolved in 900 mg. of a solvent such a furfuryl alcohol. Portions of this solution may be directly added to a prepared cereal-based beverage such as "Instant Postum" to enhange the flavor thereof, or similar results may be obtained by incorporating the flavoring agent during the manufacture of the cereal-based beverage concentrate, such as by adding it to the liquid material prior to the final drying step. For example, when flavoring the prepared cereal-based beverage, 12 mg. of the furfuryl alcohol solution are added to 100 cc. of beverage containing 1.5% soluble and dispersible solids. When using the furfuryl alcohol solution in the manufacture of the cereal-based beverage concentrate, about 1 oz. of the furfuryl alcohol solution is used for each 8 lbs. of the final dried product. In either case, a beverage especially acceptable to some tastes may be obtained by adjusting the pH to about 5 by the addition of citric acid or the like.

This application is a continuation-in-part of our copending applications Serial Nos. 525,353 and 525,354, both filed July 29, 1959, now both abandoned.

Having fully described our invention, it is to be understood that we do not wish to be limited to the details set forth, but our invention is of the full scope of the appended claims.

We claim:
1. Bis-(2-benzofuryl) disulfide.
2. Bis-(3-indolemethyl) disulfide.
3. Bis-(3-thionaphthenylmethyl) disulfide.
4. Bis-benzofurfuryl sulfide.

References Cited in the file of this patent

UNITED STATES PATENTS 2,507,473    Koelsch ------------------ May 9, 1950

OTHER REFERENCES

Conant: The Chemistry of Organic Compounds, pages 269; 520–523 (1934).
Oddo: La Gazzetta Chimica Italiana, vol. 70, page 565 (1940).
Lowy et al.: An Introduction to Organic Chemistry, page 213, 6th Ed. (1945).
Licari et al.: J. American Chem. Soc., page 4040, vol. 76 (1954).